United States Patent
Eaton

(10) Patent No.: US 7,551,170 B2
(45) Date of Patent: Jun. 23, 2009

(54) DISPLAY STATE SENSING

(75) Inventor: Gerald Eaton, Waltham, MA (US)

(73) Assignee: Bose Corporation, Framingham, MA (US)

( * ) Notice: Subject to any disclaimer, the term of this patent is extended or adjusted under 35 U.S.C. 154(b) by 613 days.

(21) Appl. No.: 10/863,930

(22) Filed: Jun. 8, 2004

(65) Prior Publication Data
US 2006/0007221 A1 Jan. 12, 2006

(51) Int. Cl.
*G06F 3/038* (2006.01)
(52) U.S. Cl. .......................... 345/207; 345/87; 345/211
(58) Field of Classification Search .................. 345/87, 345/204, 207, 102, 211–213
See application file for complete search history.

(56) References Cited

U.S. PATENT DOCUMENTS

| | | | |
|---|---|---|---|
| 5,440,232 A | 8/1995 | Scarzello et al. | |
| 5,512,823 A | 4/1996 | Nepveu et al. | |
| 5,659,367 A | 8/1997 | Yuen et al. | |
| 5,729,251 A * | 3/1998 | Nakashima | 709/250 |
| 5,801,684 A * | 9/1998 | Uskali | 345/213 |
| 6,147,669 A | 11/2000 | Bessel et al. | |
| 6,492,781 B2 * | 12/2002 | Palmer et al. | 315/307 |
| 6,570,559 B1 | 5/2003 | Oshima | |
| 7,027,042 B2 * | 4/2006 | Heo | 345/204 |
| 2001/0015725 A1 * | 8/2001 | Nakanishi et al. | 345/207 |
| 2003/0074587 A1 | 4/2003 | Casebolt et al. | |
| 2003/0146884 A1 | 8/2003 | Heo | |
| 2005/0110787 A1 * | 5/2005 | Lin | 345/211 |
| 2005/0128067 A1 * | 6/2005 | Zakrewski | 340/511 |
| 2005/0146540 A1 * | 7/2005 | Marshall et al. | 345/698 |

FOREIGN PATENT DOCUMENTS

| | | |
|---|---|---|
| EP | 1 122 712 | 8/2001 |
| JP | 03 259180 | 11/1991 |
| JP | 08 030247 | 2/1996 |
| WO | WO 03/083495 | 10/2003 |

OTHER PUBLICATIONS

Statement of Product On Sale Prior to Jun. 8, 2004.
Office Action dated Jan. 18, 2008 from counterpart Chinese Application No. 200510076413.9.
Examination Report dated Oct. 15, 2008 in corresponding European Application No. 05104360.2.
XP000301874, IBM Technical Disclosure Bulletin, 34 (9): 281-283 (1992).
Office action received from Chinese Patent Office in corresponding Chinese Application No. 200510076413.9, dated Jan. 9, 2009.

* cited by examiner

*Primary Examiner*—Richard Hjerpe
*Assistant Examiner*—Kimnhung Nguyen
(74) *Attorney, Agent, or Firm*—Fish & Richardson P.C.

(57) ABSTRACT

A system for sensing the state of a display includes a display, a sensor proximate to said display configured to detect electromagnetic radiation generated by said display, at least one signal processing means configured to process a signal received from said sensor, and wherein said at least one signal processing means outputs a signal representative of the state of said display. The system may also include a media device, in communication with said display, the state of which may be coordinated with the state of said display in response to the output of said at least one signal processing means.

27 Claims, 5 Drawing Sheets

DISPLAY STATE SENSING

BACKGROUND OF THE INVENTION

This invention relates to the sensing of the state of a display, and more particularly to the sensing of the state of a display and coordinating that state with the state of a media device. Conventional cathode ray tube (CRT) displays produce electromagnetic radiation or interference (EMI) related to the scan rate of the electron beam from the CRT. The on/off state of a CRT display may be sensed by narrow band detecting the presence of this EM radiation (e.g. using a first bandpass filter centered at the scan frequency and a second bandpass filter centered at the first harmonic of the scan frequency, each with a bandwidth of approximately ⅓ octave) at a location proximate to the CRT display. However, other display types such as rear projection, LCD and plasma displays do not utilize a scanning beam to produce an image. Known means of display state detection therefore cannot effectively detect the state of other display types.

BRIEF SUMMARY OF THE INVENTION

According to the invention, a system for sensing the state of a display comprises a display, a sensor proximate to said display configured to detect electromagnetic radiation generated by said display, at least one signal processing means configured to process a signal received from said sensor, and wherein said at least one signal processing means broadband detects the level of signal present (where broadband detection implies detecting EM radiation over a bandwidth substantially wider than ⅓ of an octave) and compares the broadband detected signal with a threshold signal, and outputs a signal representative of the state of said display. The system may also include a media device, in communication with said display, the state of which may be coordinated with the state of said display in response to the output of said at least one signal processing means.

The details of one or more embodiments of the invention are set forth in the accompanying drawings and the description below. Other features, objects, and advantages of the invention will be apparent from the description and drawings, and from the claims.

DETAILED DESCRIPTION

The figures and descriptions thereof depict a preferred embodiment of the present invention for illustration purposes only. It will be readily apparent to one of ordinary skill in the art that alternative embodiments of the systems and methods described herein may be employed without departing from the principles described herein.

Figure 1:
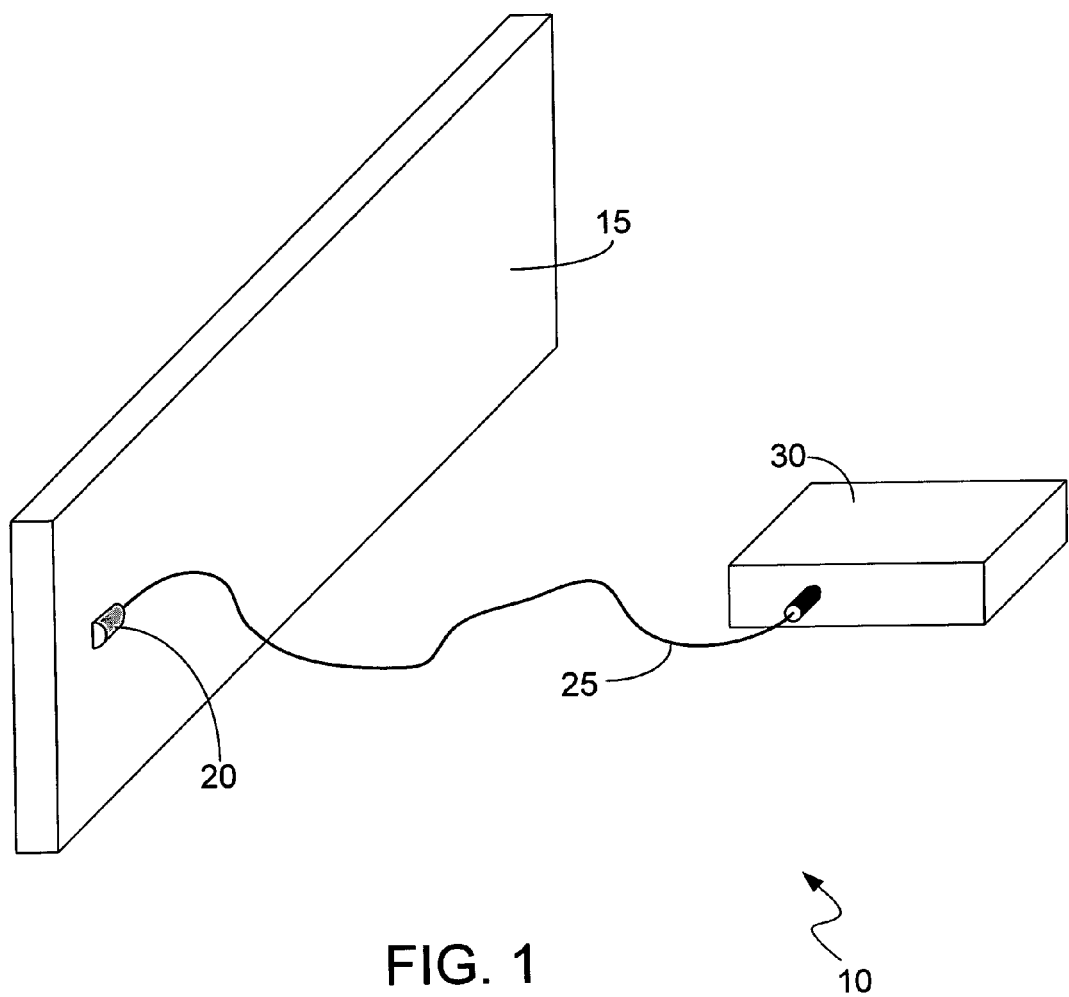
FIG. 1 shows a representation of a system for sensing and coordinating the state of a display with the state of a media device.

System 10 for sensing and coordinating the state of a display with the state of a media device has a media center console 30 in communication with a sensor 20 through lead 25. Sensor 20 is placed in proximity to a display 15 to detect EM radiation generated by display 15. FIG. 1 shows sensor 20 attached to the back of display 15, but any placement proximate to display 15 which permits sensor 20 to detect EM radiation is possible. Sensor 20 may be a passive sensor comprising a wire loop, which may generate an electric signal in the presence of an EM field. In one embodiment, such a sensor may be formed by 25 turns of 30 AWG wire wound on a reel within an elliptical housing assembly formed of plastic, with a lead-in to the loop sensor comprising two 30 AWG stranded wires contained within a black outer insulation material. While the precise dimensions, type of wire and shape are not critical, the sensor requires a sufficient number of turns and loop area to detect enough EM radiation to permit electronic processing, and in a broad enough frequency range to permit the detection of the state of a wide range of display types. Alternatively, sensor 20 may also be an electronic sensor configured to detect EM radiation. Power may be supplied to sensor 20 through lead 25.

Electromagnetic emissions of interest from display 15 induce a signal in sensor 20. The signal is amplified to a useful amplitude and filtered so that only energy within a desired spectral range is passed to a level detector. Amplification and broadband filtering (typically a bandpass filter, where one known method of accomplishing the bandpass filter is to cascade low pass and high pass filters) can be performed in a single stage, or may be distributed in multiple stages, and one of ordinary skill in the art will recognize that there are numerous possible topologies of circuitry which may accomplish the gain and filtering functions. By broadband filtering, we mean filtering that has a bandwidth substantially greater than ⅓ of an octave. In one embodiment, the −3 dB bandwidth is approximately 3.3 octaves. The level of the amplified and filtered signal is then determined. Level detection can be performed using a number of known techniques. In one embodiment, the level detection function is performed by a peak detector. However, other level detection methods such as RMS and averaging may also be applied. Level detectors also typically rectify the signal. The amplified, filtered, rectified and level-detected signal may then be compared to a threshold level. When the detected level is determined to have exceeded the threshold level, the display is assumed to be in an operating state. When the detected level does not exceed the threshold, the display is assumed to be in a non-operating or standby or sleep state. In one embodiment, the comparison is performed by a comparator, where one input of the comparator is the level detected signal of interest and the other input is a reference voltage adjusted according to the particular embodiment.

Figure 2:
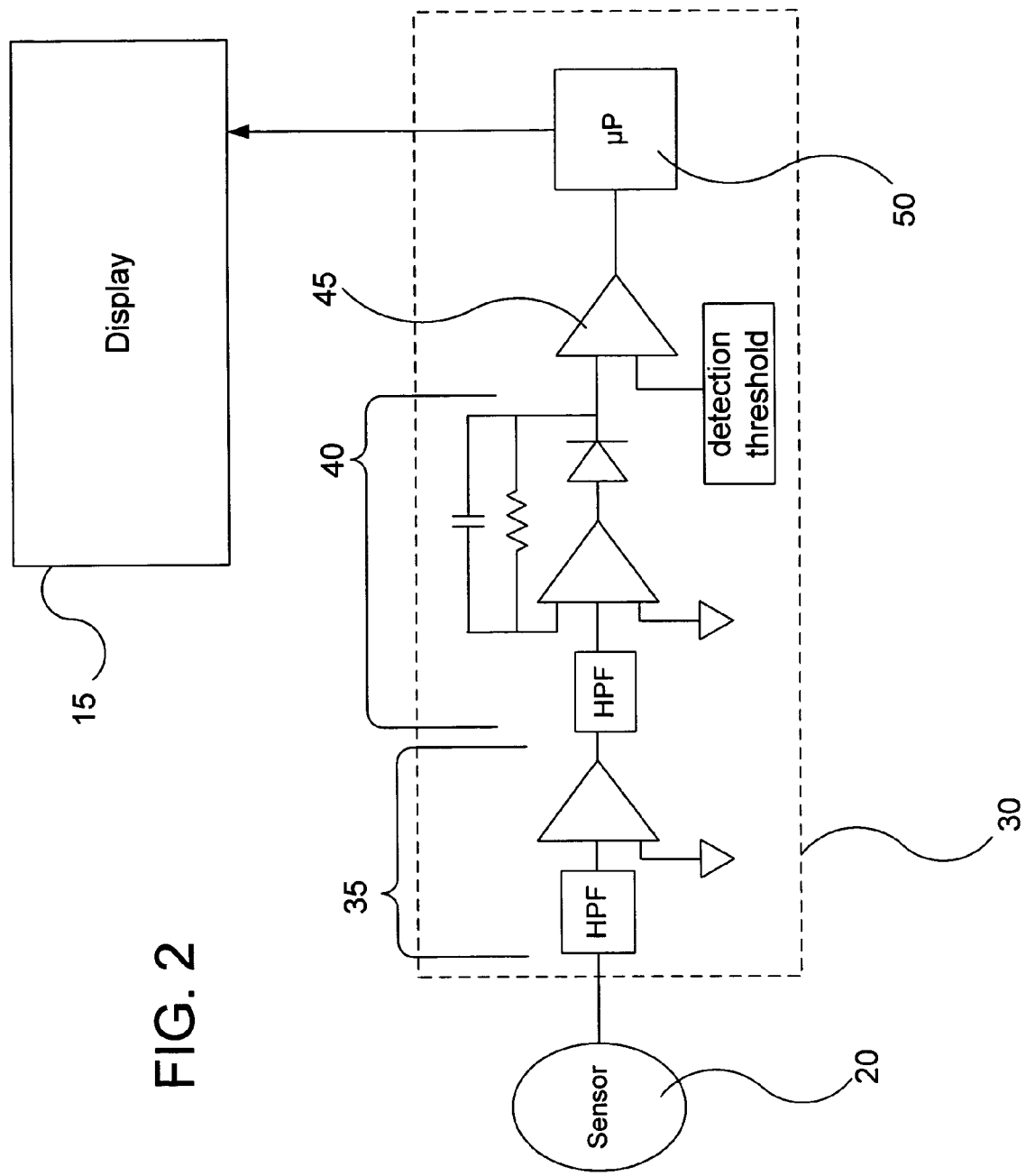
FIG. 2 shows a block diagram of a signal path in one embodiment of the invention.

In response to the output of the comparator, a signal may be sent to display 15 to coordinate its state with that of console 30. FIG. 2 shows a block diagram representation of one embodiment of the invention. Referring to FIG. 2, EM radiation is detected by sensor 20 and a signal is sent from sensor 20 to console 30 where it may be processed by first circuitry 35 and second circuitry 40. First circuitry 35 and second circuitry 40 are configured to detect the level of EM radiation present at the location of sensor 20 in a frequency range, preferably from 8 kHz to 100 kHz, as may be generated by a rear projection, plasma screen or liquid crystal display. Alternatively, filtering may also be configured to detect EM radiation in frequency ranges associated with CRT displays and other types of displays. In an embodiment, first circuitry 35 and second circuitry 40 are configured to determine a peak level of detected RF emissions in a desired frequency range and to compare the detected peak level to a threshold level to permit the detection of the state of display 15. First circuitry 35 performs the steps of high pass filtering and amplification. In one embodiment, first circuitry 35 is configured to apply a first order high pass filter with a pole located at 15 kHz and a gain of 20 dB. Second circuitry 40 performs the steps of high pass filtering, amplification and peak detection. In one embodiment, circuitry 40 is configured to apply a first order high pass filter with a pole at 15 kHz and a gain of 20 dB, and is also configured to peak detect the resulting signal. It should be noted that the order in which filtering, amplification, and level detection are performed can be altered from the order described herein and still fall within the scope of the current invention. Additionally, there are numerous methods known to construct a peak detector. In one embodiment, in the negative feedback path of an operational amplifier, a diode is placed in series with a parallel combination of a resistor and capacitor. The peak detector also performs the function of a signal rectifier.

The amplified, filtered, rectified and peak signal may be then compared to a voltage threshold by comparator 45, the output state of which signifies whether display 30 is on or off. The threshold is correlated with an expected amplitude of EM emission generated by, e.g., a plasma screen or LCD display when operating. The threshold should be set such that it is always exceeded when display 30 is in operation, and never exceeded when display 30 is not in operation. The combination of the gain of the sensor, the gain of the amplification circuitry, and setting of the detection threshold allow adjustment of the desired overall sensitivity of the system. The system parameters (gains and threshold) are chosen so that the overall detection circuit is sensitive enough detect emissions from the desired display without requiring significant adjustment of the placement of sensor 20, while not being so sensitive that it detects undesirable signals, such as the on/off state of other nearby electronic equipment or AM radio transmissions.

A signal may then be communicated to a microprocessor 50. Microprocessor 50 may make a determination of the state of display, e.g., whether it is on or off. Amplification, filtering, rectification and level detection of the sensor signal may be performed in circuitry, or equivalently can be performed in software as well with the inclusion of digital signal processing means. In such case, the sensor signal may be sampled with an analog-to-digital signal converter. The resultant digital signal may then be amplified and filtered digitally. Alternatively, some portion of signal processing may be performed by analog signal processing means and another portion may be performed by digital signal processing means.

Microprocessor 50 may compare the state of display 15 with the state of console 30 based on a received command. For example, the command may be a power on/off signal. The command may also be a source selection signal, if, e.g., the console is part of a multimedia or home entertainment system; in such case, where a user may select among numerous input devices (CD, DVD, etc.) a source selection signal may switch input selection to a DVD player, and in some systems may also cause the console to power up if needed. In response to the command received, microprocessor 50 may compare and coordinate the states of console 30 and display 15. For example, if console 30 is powering on, and display 15 is off, microprocessor 50 may send a signal to display 15 to turn it on. Similarly, if display 15 is on and console 30 is powering off, microprocessor 50 may send a command to display 15 to turn it off. In the case where, e.g., display 15 is off and console 30 is powering off, or display 15 is on and console 30 is powering on, no command would be sent from microprocessor 50 to display 15.

Although the foregoing description considers an embodiment with one sensor and one display, equivalently, multiple displays with multiple proximate sensors may be employed with the system, with a microprocessor configured to distinguish among the displays and related sensor signals.

In an alternative embodiment, sensor 20 may communicate with console 30 wirelessly, such as by radio frequency transmission. In such an embodiment, sensor 20 may include a sensor loop as described above, and may further include amplification, filtering, and detection circuitry similar to that described above in the console; a microprocessor which may monitor the output of the sensor and control the wireless link between sensor and console; a radio frequency transceiver in the sensor; a radio frequency transceiver in the console; and a power supply for the sensor.

Figure 5:
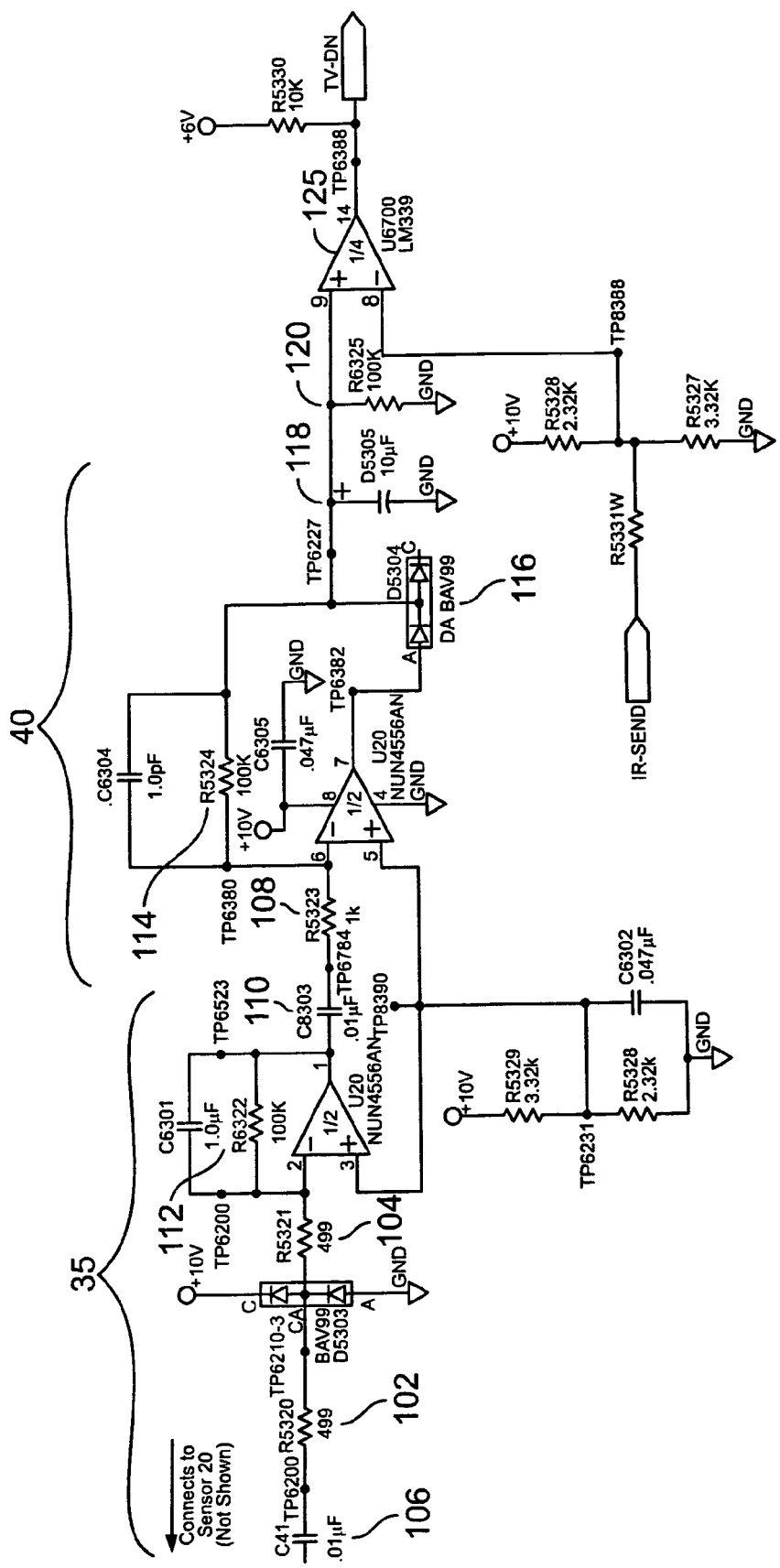
FIG. 5 shows a circuit diagram in one embodiment of the invention.

FIG. 5 shows a circuit diagram of one embodiment of circuitry to enable detection of a signal from sensor 20. First circuitry 35 and second circuitry 40 may be amplifier and high-pass filter stages that amplify and filter the signal from sensor 20. The gain of each stage may permit amplification of a signal from sensor 20, and may be set at 20 db in an embodiment. A high pass filter cutoff frequency may prevent detection of higher frequency signals, such as in the AM radio frequency range, and may be set to 15 kHz in an embodiment. In the circuit depicted, the pole of the first order high pass filter in first circuitry 35 is set by resistors 102 and 104 and by capacitor 106, and the peak gain is determined by the resistors 112, 104, and 102. In second circuitry 40 the pole of the first order high pass filter is set by resistor 108 and capacitor 110, and the gain is set by the combination of resistor 114 and resistor 108. Second circuitry 40 as depicted also includes diode 116 in its feedback path which is used to form a rectifier circuit in conjunction with capacitor 118 and resistor 120. This rectifier circuit may be used to detect the peak of the amplified EM sensor output signal in the desired frequency range and hold this peak value with a time constant (here, one second) set by capacitor 118 and resistor 120. The amplified, filtered, rectified and peak detected signal may be compared to a voltage threshold by comparator 125. The output state, high or low, of threshold comparator 125 signifies whether the display is on or off, respectively. In this embodiment, the high frequency cutoff of the system is determined by the slew rate limitation of the operational amplifiers used in conjunction with first circuitry 35 and second circuitry 40, and the −3 dB frequency of the low pass characteristic resulting from the slew behavior is approximately at 100 kHz. This low pass behavior in conjunction with the high pass filters mentioned earlier forms a bandpass filter. It is advantageous to limit the response of the detection circuit at high frequencies, to avoid detection of spurious signals such as AM broadcasts.

Figure 3:
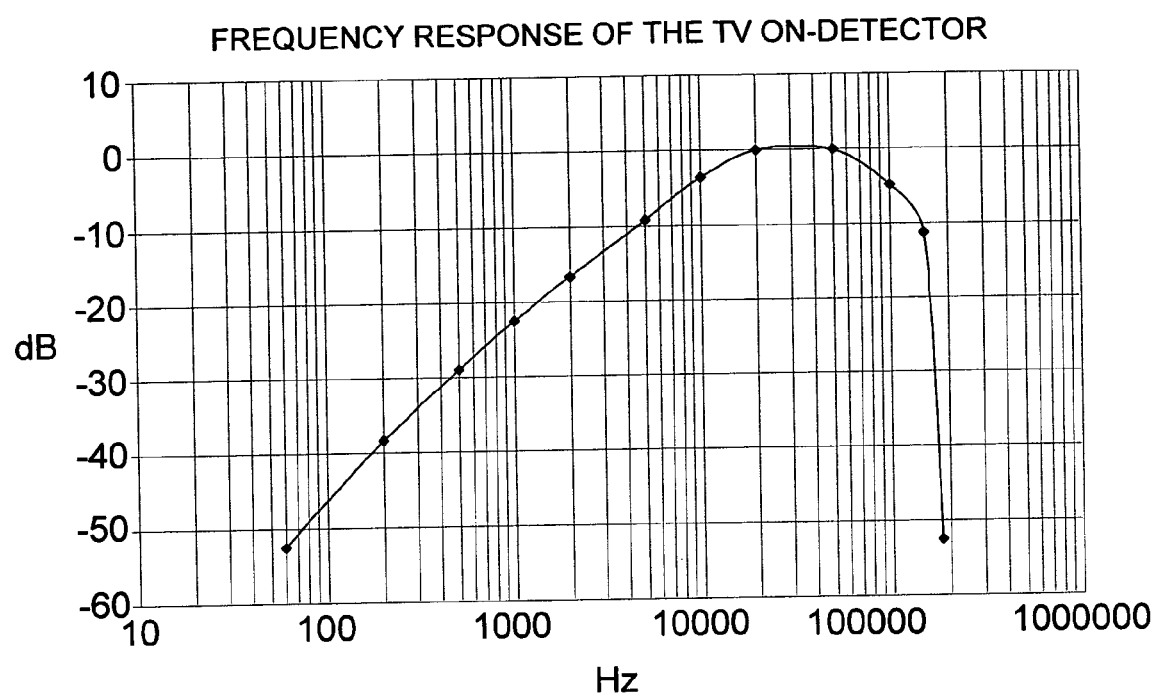
FIG. 3 shows the frequency response of the system in one embodiment of the invention.

FIG. 3 shows the frequency response of the system in one embodiment of the invention. It should be noted that the gain in the passband of FIG. 3 has been normalized to 0 dB for clarity. In the above described embodiment, the passband gain would be 40 dB. The slope of the curve at low frequencies differs from a second order behavior, which one would expect from the inclusion of two first order high pass filters. This is due to slew rate limiting behavior in the op amp and the fact that because of the presence of diode 116 in the op amp feedback path, for a portion of time the op amp is operating in an open loop condition. The frequency response of first circuitry 35 and second circuitry 40 may designed to be sufficiently sensitive to a variety of displays, such as plasma, LCD, rear projection and CRT displays in a frequency region where they emit electromagnetic radiation, but to have low gain at both lower and higher frequencies, to make the system less sensitive to other sources of EMI, e.g., of an AC power supply or AM transmitter. The response is designed so that the system does not detect other nearby electronic devices which may change state. In one embodiment, series capacitors may be used to reduce the gain in first and second circuitry at 60 Hz, and lower order harmonics thereof (e.g., second and third harmonics). In another embodiment, sensor 20 may be configured to have lower gain at 60 Hz than from 8 kHz to 100 kHz. Both series capacitors and lower gain sensor configuration may be used together in one embodiment. Alternative frequency responses may also be used, where higher order rolloffs are applied, or notch filters are used to reduce sensitivity of the detection circuitry in frequency ranges where interfering signals are known to exist.

Figure 4:
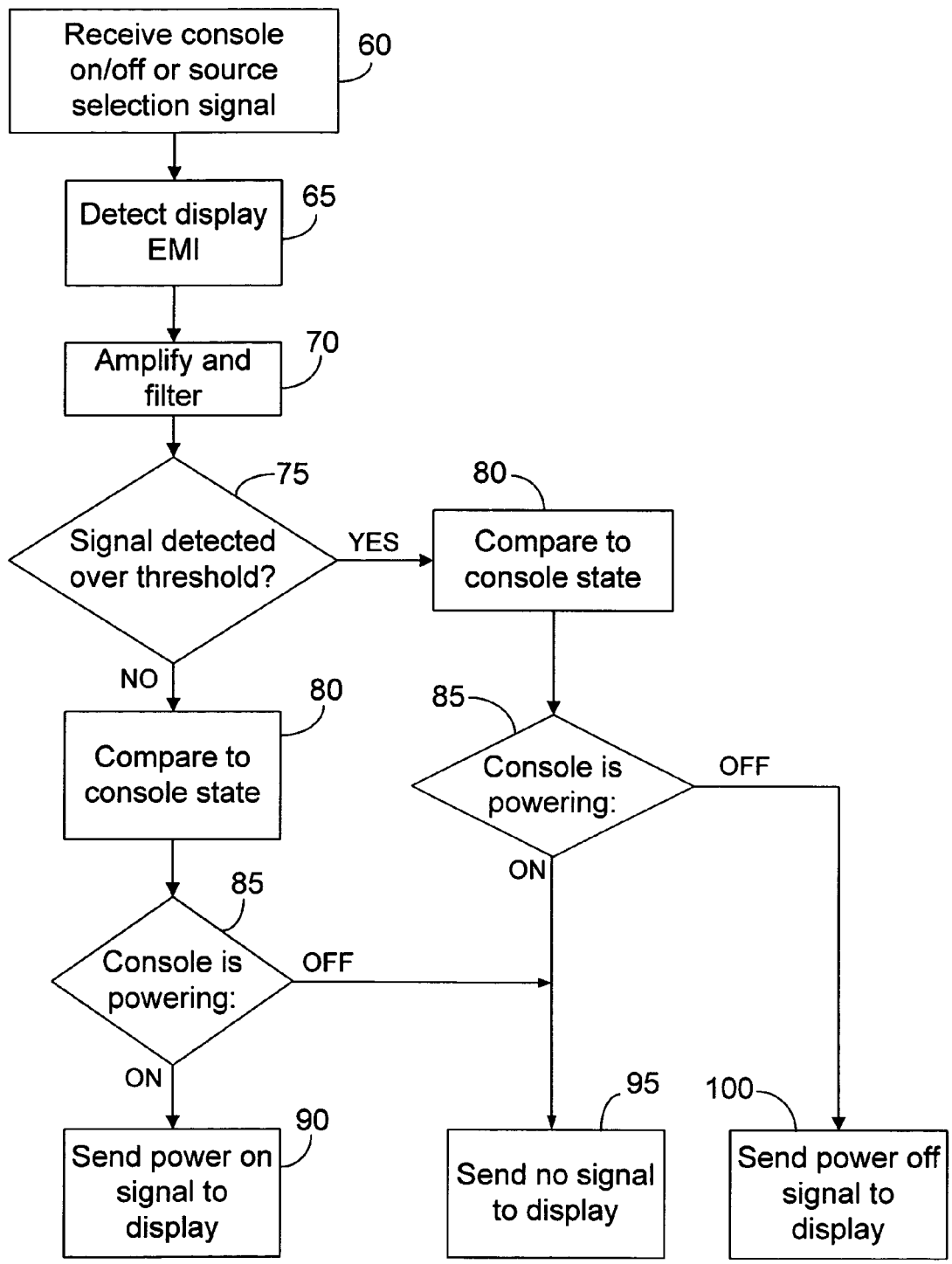
FIG. 4 shows a block flow diagram of a method of sensing and coordinating the state of a display with the state of a media device.

FIG. 4 shows a block flow diagram of a method of sensing and coordinating the state of a display with the state of a media device. A power on/off signal or a source selection signal may be received 60. The EMI proximate to a display may then be detected 65 by a sensor, which in response may send a signal to the console. The signal may be amplified, filtered, rectified and peak detected 70. The amplified and filtered signal may then be compared to a threshold 75 to determine a display state, which may then be compared to the state of the console 80. The state of the media device and the display may then be coordinated. If the console is powering on and the display is off, a signal may be sent to turn the display on 90. Similarly, if the display is on and the console is powering off, a signal may be sent to turn the display off 100. If the display is off and the console is powering off, or if the display is on and the console is powering on, no command would be sent to the display 95.

The foregoing description illustrates only certain preferred embodiments, and one of ordinary skill in the art will recognize that the concepts embodied herein may be readily adapted without undue experimentation and may be embodied in other specific forms without departing from the essential characteristics hereof. Accordingly, the disclosure is intended to be merely illustrative and not limiting of the scope of the invention described in the following claims.

What is claimed is:

1. A system for sensing a state of a display, comprising:
  a display;
  a sensor, proximate to said display, for sensing electromagnetic radiation generated by said display; and
  at least one signal processing means;
    wherein said at least one signal processing means is configured to process a signal received from said sensor;
    wherein said at least one signal processing means further includes broadband filtering means,
    wherein said at least one signal processing means is configured to output a signal representative of the state of said display, and
    wherein, in response to the signal representative of the state of the display, the display is powered on.

2. The system of claim 1 wherein said display is one of an LCD display, a plasma display, and a rear projection display.

3. The system of claim 1 wherein said at least one signal processing means is further configured to have low sensitivity to electromagnetic radiation below 180 Hz.

4. The system of claim 1 wherein said at least one signal processing means is further configured to have low sensitivity to electromagnetic interference substantially above 100 kHz.

5. The system of claim 1 wherein said sensor is in wireless communication with a media device.

6. The system of claim 1 wherein said signal processing means is a digital signal processor.

7. The system of claim 1 wherein said signal processing means further comprises amplifier circuitry, filter circuitry, and level detection circuitry.

8. The system of claim 1 wherein said at least one signal processing means is configured to detect electromagnetic radiation generated by said display in a range from 8 kHz to 100 kHz.

9. The system of claim 1 further comprising a media device in communication with said display.

10. The system of claim 9 wherein said at least one signal processing means is further configured to determine a state of said media device.

11. The system of claim 1 further comprising a processor means in communication with said display and with said signal processing means.

12. The system of claim 11 wherein said processor means is further configured to coordinate the state of the display with a state of a media device in communication with the display.

13. A method for sensing a state of a display, comprising:
  sensing electromagnetic radiation generated by the display with a sensor;
  producing a broadband signal representative of said electromagnetic radiation;
  processing said broadband signal to produce a processed signal;
  comparing said processed signal to a signal threshold to determine the state of said display,
  and powering on said display when said processed signal is on one side of said threshold.

14. The method of claim 13 wherein said processing comprises amplifying, filtering and level detecting said sensor signal.

15. The method of claim 13 wherein said processing permits detection of electromagnetic radiation in a range from 8 kHz to 100 kHz.

16. A method for sensing and coordinating a state of a display with a state of a media device, comprising:
  receiving a power/selection signal at the media device;
  sensing electromagnetic radiation generated by the display;
  producing a broadband sensor signal in response to said sensing;
  comparing said broadband sensor signal to a signal threshold;
  determining a display state of said display based on said comparing; and
  powering off the display in response to a comparison of the display state with the state of the media device.

17. The method of claim 16 wherein, after producing, the method further comprises:
  processing said sensor signal.

18. The method of claim 17 wherein said processing comprises amplifying, filtering and rectifying said sensor signal.

19. The method of claim 17 wherein said processing permits detection of electromagnetic radiation in a range from 8 kHz to 100 kHz.

20. The method of claim 17 further comprising:
  coordinating the states of said display and said media device.

21. The method of claim 20, wherein coordinating further comprises sending a power on/off command to said display.

22. A system for sensing and coordinating a state of a display with a state of a media device, comprising:
  the display;
  the media device in communication with said display;

a sensor, proximate to said display, in communication with said media device;

said sensor configured to detect electromagnetic radiation generated by said display;

a signal processing means; and a comparison means configured to output a signal representative of the state of said display as compared to the state of said media device, wherein said display is powered off in response to said signal output by said comparison means.

23. The system of claim 22 wherein said signal processing means is configured to process a signal received from said sensor.

24. The system of claim 22 wherein said media device further comprises:

a processor means configured to determine a state of said media device.

25. The system of claim 22 wherein said media device further comprises:

a processor means configured to coordinate said display state and said media device state.

26. The system of claim 22 wherein said signal processing means is adjustable to detect electromagnetic radiation from different types of displays.

27. The system of claim 22 wherein the comparison means is adjustable to detect electromagnetic radiation from different types of displays.

* * * * *